Jan. 6, 1953 J. M. CARPENTER 2,624,107
FIXTURE ASSEMBLY
Filed Aug. 16, 1949 4 Sheets-Sheet 1

INVENTOR.
JOHN M. CARPENTER
BY
Alden D. Redfield
Robert L. Spencer
ATTORNEYS

Jan. 6, 1953 J. M. CARPENTER 2,624,107
FIXTURE ASSEMBLY
Filed Aug. 16, 1949 4 Sheets-Sheet 2

INVENTOR.
JOHN M. CARPENTER
BY
ATTORNEYS

INVENTOR.
JOHN M. CARPENTER

Jan. 6, 1953　　　　J. M. CARPENTER　　　　2,624,107
FIXTURE ASSEMBLY

Filed Aug. 16, 1949　　　　　　　　　　　4 Sheets-Sheet 4

INVENTOR.
JOHN M. CARPENTER

BY
Alden D. Redfield
Robert L. Spencer
ATTORNEYS

Patented Jan. 6, 1953

2,624,107

UNITED STATES PATENT OFFICE 2,624,107

FIXTURE ASSEMBLY

John M. Carpenter, Donelson, Tenn., assignor to Avco Manufacturing Corporation, Cincinnati, Ohio, a corporation of Delaware Application August 16, 1949, Serial No. 110,582

5 Claims. (Cl. 29—286)

This invention relates to an improved jig or fixture assembly and to means for attaching jig and fixture locating members (hereinafter referred to as detail locators) to a rigid fixture framework such as a frame jig. The invention is particularly useful in connection with the assembly of detail locators to frame jigs in which accurate dimensional relationships are critical and by conventional methods extremely difficult to achieve.

It will be readily understood, however, that the invention is also useful in applications which may or may not require changes in the dimensional relationships between detail locators periodically; or which may require subsequent changes in the dimensional relationships in detail without destroying accurate locations of other important points, planes, or assemblies of the tool fixture or other structure.

In conventional practice, the complete fixture, which consists of a framework having a plurality of detail locators secured thereto, is made by welding the detail locators in place on the fixture framework. Because of the variations in the floor levels of different buildings, the welding of the detail locators to the fixture framework must be done at the location where the fixture is to be used and leaded pads must be used under the legs of the framework to correct error in the length of the legs of the framework on the uneven floor contour.

In this type of structure it is practically impossible to hold the necessary dimensional tolerances on the detail locators required for accurately producing a product in mass production. In conventional jig and fixture construction an attempt is made to hold various planes of the basic supporting structure in close relationship so that errors are minimized. However, while setting one point or plane on complicated fixtures, the welding of the detail locator to the framework in most cases moves or deflects a previously set point or plane due to stresses set up in the framework as a result of the heat applied in the act of welding. Thus, in order to hold planes and points as closely as possible for detail locators, the details of conventional fixture frameworks are machine cut, and in some instances a considerable amount of machining is done in an attempt to hold accurate dimensions on the finished fixture as it is assembled.

Accordingly, an object of my invention is to provide a simple means for attaching tool jig and fixture detail locators to a fixture framework by which such detail locators or fixture components may be accurately positioned without the use of expensive, complicated machining.

Another object of my invention is to provide a novel means for assembling fixture detail locators to a fixture framework whereby the detail locators can easily be removed or replaced without destroying the accurate dimensional relationship between other detail locators of the jig or fixture.

A further object of my invention is to provide a simple means of attaching or repositioning detail locators or assemblies on the fixture framework without the use of excessive heat, extreme forces, or other detrimental means which tend to cause the jig or fixture framework to warp, sag, twist, or otherwise change the dimensional relationship between detail locators of the same jig or fixture.

Another object of my invention is to provide a means of using the advantages of a low-melting temperature alloy to freeze the detail locators or assemblies rigidly to a framework.

A further object of my invention is to provide a means of individually, or in groups, locating points or planes of detail locators singly or in combination in three dimensional space on a jig or fixture framework without disturbing the accuracy of previously fixed points or planes of other detail locators of the same jig or fixture.

A still further object of my invention is to construct a rough jig or fixture framework having nearly correct dimensions at some location remote from its intended use; to independently of said framework manufacture detail locators at another location; and to then assemble the locators and framework at the place of use with no detectable dimensional error between important locating points and/or planes arising as a result of uneven floors, inaccurate workmanship, error in measurements, or other errors normally occurring in conventional jig and fixture construction.

Still another object of my invention is to provide a fixture assembly including a rough supporting structure and a detail locator in which the detail locator is detachably retained upon the supporting structure and in which two portions of the supporting structure are retained in fixed relationship by means of molten metal which, upon solidification, affixes said portions to each other.

These and other objects of my invention will be apparent from the following description and claims taken in conjunction with the accompanying drawings, in which:

The accurate location of points and planes in jig and fixture constructions used to rigidly hold manufactured parts in position while the product parts are being fastened together has been one of the expensive items in tooling up or retooling for a manufactured product. The following disclosure presents a new and improved approach to the problem which eliminates much of the tediousness, error, and expense in manufacturing jigs and fixtures.

Figure 1:
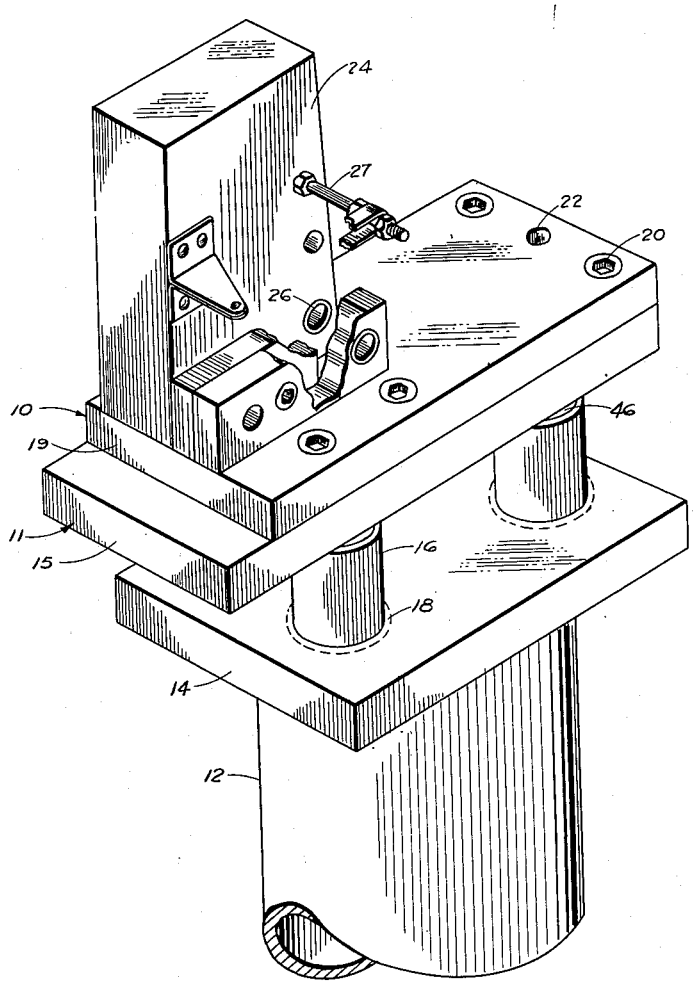
Fig. 1 is a perspective view of a single fixture and detail locator assembly constructed in accordance with the principles of my invention.

In Fig. 1, there is shown a new and improved means and method for fastening a single detail locator assembly indicated generally at 10 to a rough fixture supporting structure on a base indicated generally at 11. The rough fixture supporting structure illustrated in Fig. 1 includes a post 12 which may be attached directly to the floor or to a fixture framework as the case may be, a base plate 14 welded to the post and adapted to receive as many cups 16 as required by the loads or weight to be carried by the fixture detail locator involved, and a base pad 15 spaced from base plate 14. In the example, four such cups 16 are welded as at 18 to the base plate 14. The detail locator includes a mating plate 19 which is attached to the base pad 15 by means of cap screws 20 and is accurately positioned upon base pad 15 by means of two or more dowel pins (not shown) extending through reamed holes 22 in each of the pads, a locating plane 24 having a reference point 26 thereon and carrying a clamp 27 for holding the material to be assembled to the fixture.

Figures 2, 3:
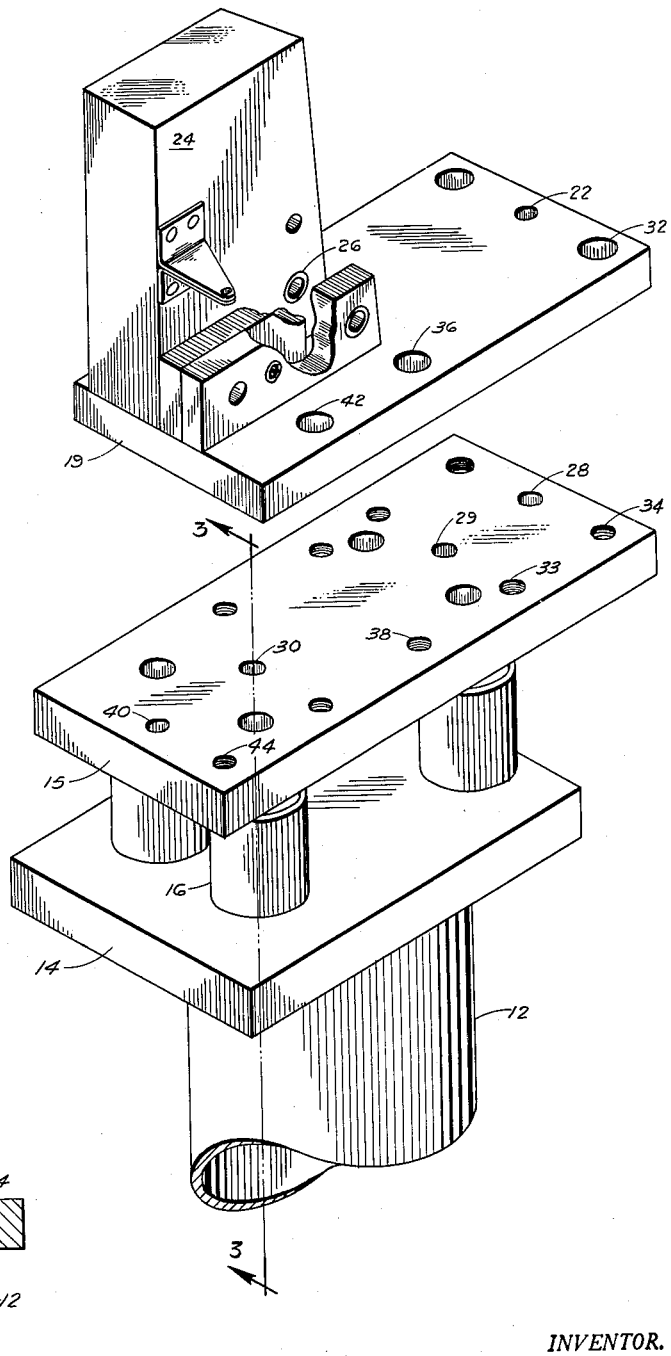
Fig. 2 is a perspective view more clearly illustrating the details of the assembly illustrated in Fig. 1.
Fig. 3 is a sectional view taken along the line 3—3 of Fig. 2.

In Fig. 2, common reference numerals are used to indicate the features common to Fig. 1. As shown, the detail locator is made so that it has two working positions. In one position for a one product model, dowel pins (not shown) are placed through reamed openings 22, 28 and 30, the plates 15 and 18 being clamped together by cap screws 20 (of Fig. 1) extending through openings 32—34 and 36—38 respectively. For the other production model, the dowel pins are placed through openings 22, 29 and 40 and the cap screws in threaded openings 42—44 and 33—32.

As shown in Fig. 3, which is a cross-section through the fixture support for the detail locator, the base pad 15 is provided with one or more (one for each cup) studs 45 adapted to extend into the cups 16. The studs 45 are driven or tack welded to base pad 15 and are of such length as to extend nearly to the bottom of the cup. The studs are beaded, grooved circumferentially, or otherwise roughened on the lower end to assist the alloy 46 in holding them rigidly in place in the cup. The cup 16 is roughened on its internal surface for the same reason.

Figure 4:
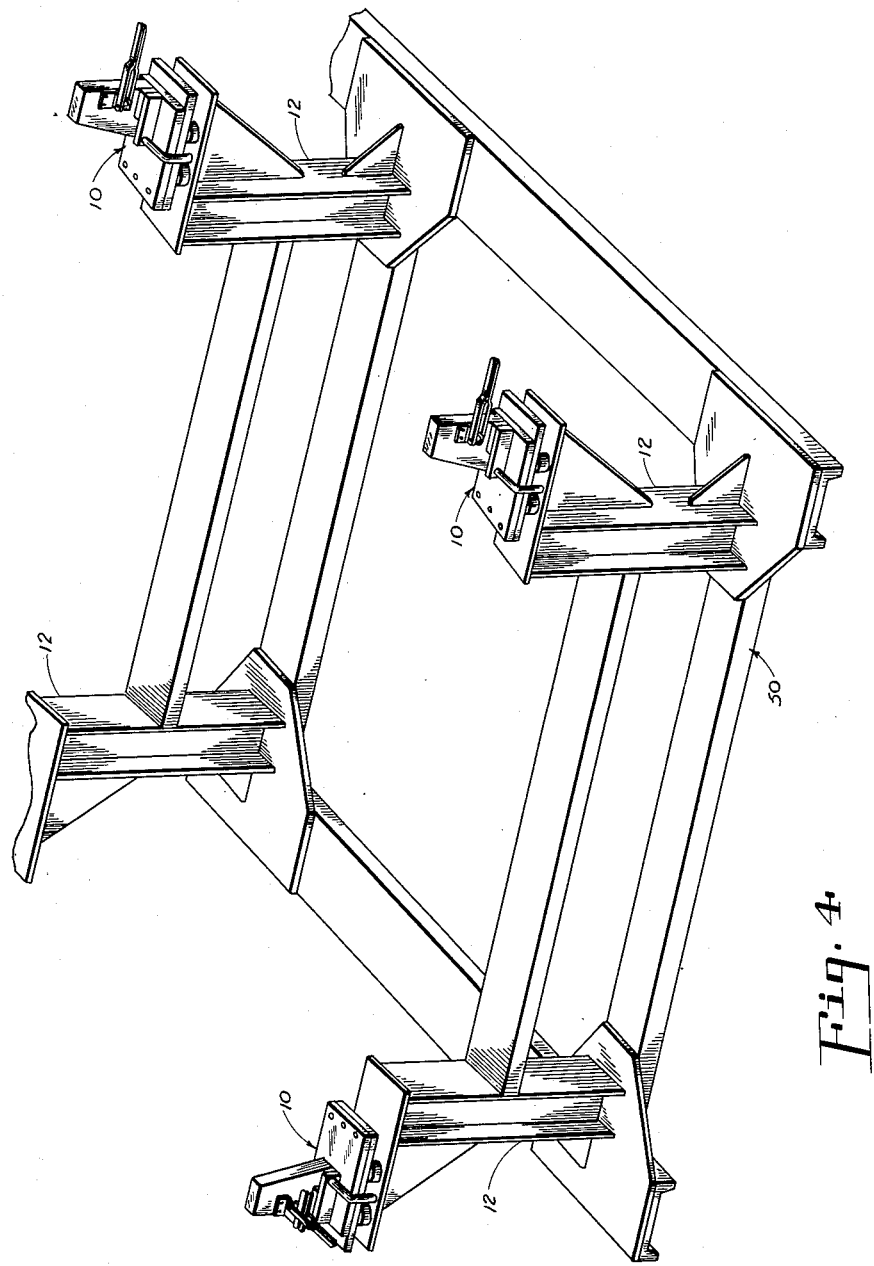
Fig. 4 is a perspective view of a complete fixture framework-detail locator assembly constructed in accordance with the principles of my invention.

In Fig. 4 there is shown a fixture assembly including a plurality of detail locators 10 assembled to a framework indicated generally at 50. Thus, in the completed fixture shown, each of the posts 12 of Figs. 1 and 2 is welded to the common framework to form a rigid fixture upon which component parts of the product may be assembled. It will be understood that while three detail locators are illustrated in the assembly fixture of Fig. 4, the framework may be elongated and any desired number of detail locators may be included.

Figure 5:
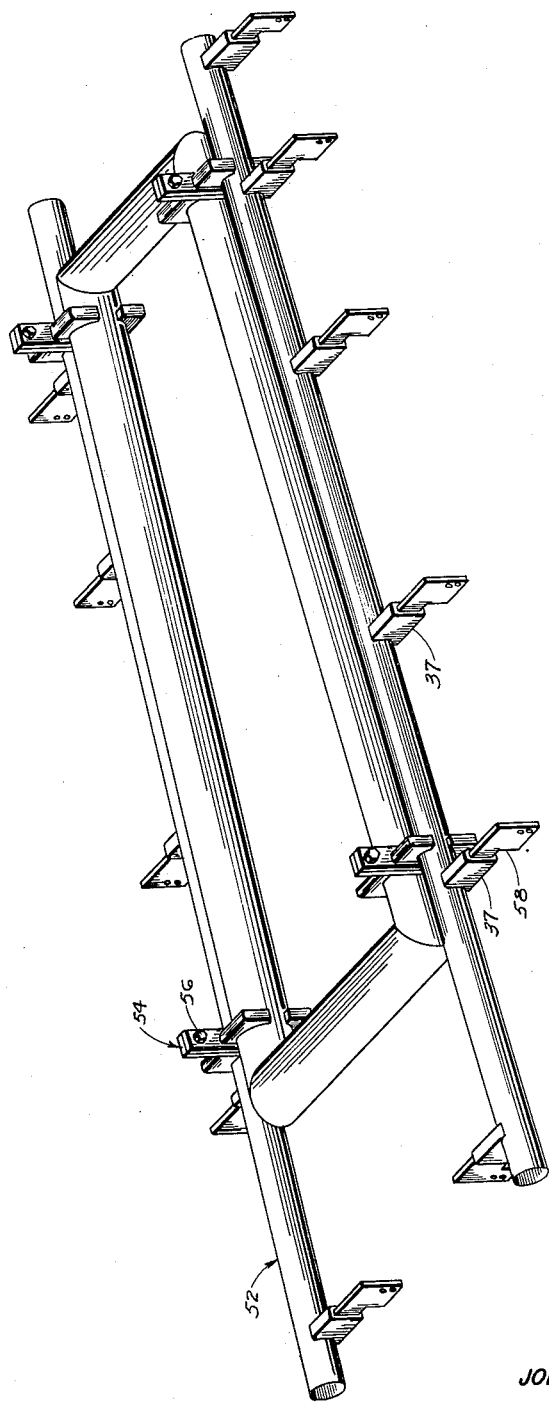
Fig. 5 is an isometric view of a fixture or master locator by which the detail locator's jig or fixture are located.

In Fig. 5 there is shown a jig or master fixture 52 which may be used to locate the detail locators on a fixture assembly of the type shown in Fig. 4. The master is made up at the same time the assembly fixture is assembled and is provided with a plurality of detail locators 54 having reference points and planes 56 and 58 secured to the master framework in relationship with each other corresponding to the reference point 26 and reference plane 24 of the detail locators 10, and may subsequently be used to check or relocate the detail locators on the fixture framework. As shown in Figs. 1 and 3, the detail locators are secured to the supporting structure by means of a low-temperature melting alloy which is poured into the cup and permitted to solidify. In the event the fixture is moved to a new location or damaged so that the fixture is deformed slightly, all of the detail locators are readily removed by heating the cups 16, and melting the alloy 46. The detail locators are then reassembled to the master and reset in the fixture frame by the use of low melting temperature alloy 46. To use the master locator, the locating planes 24 and points 26 (center line of holes 26) of Fig. 1 are placed in correct relationship to mating planes and points (such as, for example 58 and 56) on the master. The master with its attached detail locators 54 is then placed in position near the rough frame structure of the fixture so that all of the studs 45 are inserted into but out of contact with the cups and the base pad 15 of Fig. 2. Low melting temperature alloy 46 is poured in each of the cup assemblies. After the alloy has solidified, the master is removed, having the detail locators dimensionally accurately positioned with respect to each other in space and rigidly affixed to the frame, thus completing the jig or fixture.

By using an alloy having a low melting point the framework does not reach the critical temperature of the framework, steel in this case, which would cause sagging or deformation of the fixture. Further, one locator may be changed in position by the same method without disturbing the rest of the detail locators in the same fixture by melting the alloy in the cups associated with the particular locator to be changed or by removing the cap screws retaining the detail location and its supporting structure in fixed relationship. This is often necessary due to changes in the manufactured product. Accuracy is maintained in repositioning a detail locator because of a product change or damage to the new type of fixture since corresponding changes are made in the master used to reposition the detail locators. At the same time that a detail locator is set in its new position, the master may be used to check the other detail locators for acccuracy with respect to their relative positions.

Before the low temperature alloy 46 is poured around the studs 45 in cups 16 the detail locator 10 is attached to the base plate 15 with dowel pins (not shown) extending through reamed holes 22 and 28 or 22 and 29 for accurate location on the base plate and clamped by means of clamp screws in holes 32—34 or 32—33. Then, with a holding and positioning means such as a tooling dock, for example, the locating plane 24 and reference points 26 (center line of the holes 26) are located in space in exact desired dimensional relationship with respect to other planes and/or reference points of other detail locators in the same jig or fixture. With the various detail locators held in the desired location with respect to each other and the fixture framework all of the cups 16 are filled with a low-temperature melting alloy which upon freezing, rigidly locks the studs 45 in the cups 16. The locating and holding means, which, as stated, may be a tooling dock, or a jig master as shown in Fig. 5, is then removed from the detail locators and the fixture is ready for use. This is the only work required upon the fixture at its working location other than attaching the fixture to the floor, if required. It will readily be understood, therefore, that little care need be taken in the fabrication of the rough supporting structure of the fixture. The supporting structure of the fixture can be made up of welded steel with the parts flame-cut and thereby requiring no machining. Dimensions of the rough supporting structure are held only to liberal welding tolerances. Any accumulated dimensional errors due to fabrication of the welded supporting structure are eliminated when the detail locators are positioned in their desired dimensional relationship with respect to each other and the supporting structure and are frozen in place in the cups upon solidification of the alloy which is poured into the cups after the detail locators have been positioned as desired. The structure can therefore be fabricated and assembled at some remote point than that at which the fixture is to be used.

The specific alloy used in locking the studs 18 in the cups 16 consists of 48% bismuth, 28.5% lead, 14.5% tin and 9% antimony and a melting temperature range from 217 to 440° F. The critical melting temperature involved varies with conditions. Thus, for steel, the melting temperature of the alloy must be less than 1400° F., the critical temperature of steel. In any event, the melting point of the alloy must be less than the critical temperature of the material used for the fixture involved in order that there be no sagging or bending of the framework due to excess heating. While Babbitt, lead, or other low melting temperature alloys might be used to affix the studs to the cups, these metals shrink slightly and upon solidification tend to form a loose joint between the cup and stud. It has been found that a low melting temperature alloy as above described expands slightly upon solidifications and is therefore highly satisfactory in that a tight juncture is provided between the cup and stud.

As stated, in the conventional construction of fixture framework and detail locators, the detail locators are welded to the basic framework, and the repositioning of one detail locator on the framework will shift other detail locators of the same fixture. When such a fixture is assembled and moved from place to place, the only method available to check all the detail locators in relation to each other is by the use of costly conventional measuring methods. By providing a master jig as shown in Fig. 5, the relationship of the detail locators can easily and quickly be checked for accuracy. If one or more detail locators need to be repositioned, the low melting temperature alloy can be quickly melted, and the location positioned in its desired relationship on the framework. With jigs and fixtures constructed in accordance with the principles of this invention the fixture may be easily disassembled, shipped to a remote point, and there by use of the master jig be quickly and easily reassembled with the same accuracy as was obtained in the first assembly of the fixture. All of the exact expensive machining of the fixture attaching parts and the error due to welding (with resultant twisting and sagging of the framework) are eliminated.

From the above description, there is provided a fixture assembly which may easily and accurately be assembled and a novel method for assembling the same. The master jig is provided with reference locators positioned thereon which correspond to the desired position of the detail locators on its framework. In re-assembling the fixture, it is only necessary to place the master jig on the fixture framework and align the detail locators with the reference locators on the master jig. With the detail locators thus positioned on the fixture framework, the molten alloy is poured into the cups to affix the studs in the cups.

From the above description, it will be apparent that there is thus provided a device and method of the character described possessing the particular advantages before enumerated as desirable, but which is susceptible of modification without departing from the principle involved or sacrificing any of its advantages.

What is claimed is:

1. A fixture comprising a rough supporting structure and a detail locator structure, said rough supporting structure comprising a post, a base plate secured to said post, a plurality of cup shaped members secured to said base plate with their axes in generally parallel relationship, a base pad on said detail locator, a plurality of studs extending outwardly from said base pad, said studs extending into said cups, respectively, said detail locator including a mating plate adapted to be disposed in contact relationship with said base pad, a planar member secured to said mating plate formed to define a reference plane and a reference point on said plane, said reference point and reference plane being used to locate said mating plate in a predetermined position in space with respect to said supporting structure, removable means for securing said mating plate to said base pad in predetermined relationship, and means for rigidly positioning said base pad relative to said base plate, said means including cast metal disposed in said cups while molten and contacting said cups and studs, the melting temperature of said cast metal being substantially less than that of said cups and studs.

2. Apparatus as defined in claim 1 in which the surfaces of said cups and studs contacted by said cast metal are formed to define irregularities for receiving the cast metal in locking engagement.

3. In a fixture, a rough supporting structure comprising a base plate and a plurality of cup-shaped receptacles secured thereto, a base pad and a plurality of outwardly extending studs, each of said studs being located for disposition within one of said cups, a detail locator removably attached to said base pad, means associated with said detail locator for locating it and said attached base pad in a predetermined position in space relative to said base plate with said studs disposed within said cups, and means for rigidly securing said studs within said cups while said detail locator is maintained in its predetermined position in space, said last named means including cast metal disposed within said cups while molten and contacting said cups and studs, the melting temperature of said metal being substantially less than that of said studs and cups.

4. Apparatus as defined in claim 3 in which the surfaces of said cups and studs contacted by said cast metal are formed to define irregularities for receiving the cast metal in locking engagement.

5. In a fixture, a rough supporting structure comprising a base plate and a cup-shaped receptacle secured thereto, a base pad having an outwardly extending stud located for disposition within said cup, a detail locator removably attached to said base pad, means associated with said detail locator for locating it and said attached base pad in a predetermined position in space relative to said base plate with said stud disposed within said cup, and means for rigidly securing said stud within said cup while said detail locator is maintained in its predetermined position in space, said last named means including cast material disposed within said cup while molten and contacting said cup and stud, the melting temperature of said material being substantially less than that of said stud and cup.

JOHN M. CARPENTER.

REFERENCES CITED

The following references are of record in the file of this patent:

UNITED STATES PATENTS

| Number | Name | Date |
| --- | --- | --- |
| 599,493 | Clegg | Feb. 22, 1898 |
| 660,584 | Norman | Oct. 30, 1900 |
| 1,250,601 | Littmann | Dec. 18, 1917 |
| 1,331,030 | Ryan | Feb. 17, 1920 |
| 1,737,033 | Talbot | Nov. 26, 1929 |
| 2,040,165 | Baldwin | May 12, 1936 |
| 2,086,221 | Gwyn | July 6, 1937 |
| 2,332,625 | Ellis et al. | Oct. 26, 1943 |
| 2,391,510 | Pioch et al. | Dec. 25, 1945 |

OTHER REFERENCES

The article "Ultra-low-melting-point alloys," reprinted from Scientific American, January 1944, by Fred P. Peters.